United States Patent
Lee et al.

(10) Patent No.: US 12,145,697 B2
(45) Date of Patent: Nov. 19, 2024

(54) CRUISE SYSTEM USING MOBILITY VEHICLES

(71) Applicants: Hyundai Motor Company, Seoul (KR); Kia Corporation, Seoul (KR)

(72) Inventors: Sang Heon Lee, Seoul (KR); Jin Ho Hwang, Cheonin-si (KR); Dong Eun Cha, Hwaseong-si (KR); Joo Yean Kang, Hanam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 510 days.

(21) Appl. No.: 17/496,584

(22) Filed: Oct. 7, 2021

(65) Prior Publication Data

US 2022/0315176 A1 Oct. 6, 2022

(30) Foreign Application Priority Data

Apr. 6, 2021 (KR) .......................... 10-2021-0044809

(51) Int. Cl.
| | |
|---|---|
| *B63B 35/00* | (2020.01) |
| *B60L 53/16* | (2019.01) |
| *B60L 53/66* | (2019.01) |
| *B63B 29/02* | (2006.01) |
| *G05D 1/00* | (2024.01) |
| *G05D 1/02* | (2020.01) |

(52) U.S. Cl.
CPC .............. *B63B 35/00* (2013.01); *B60L 53/16* (2019.02); *B60L 53/66* (2019.02); *B63B 29/02* (2013.01); *G05D 1/0088* (2013.01); *G05D 1/0276* (2013.01); *B60L 2200/32* (2013.01); *B63B 2035/004* (2013.01)

(58) Field of Classification Search
CPC ......... B63B 29/00; B63B 29/02; B63B 35/00; B63B 2035/004; B60L 53/00; B60L 53/16; B60L 53/66; B60L 2200/32; G05D 1/00; G05D 1/0088; G05D 1/0276
USPC ........................................................... 114/70
See application file for complete search history.

(56) References Cited

U.S. PATENT DOCUMENTS

| | | | |
|---|---|---|---|
| 3,320,918 A * | 5/1967 | Zalejski | B63B 27/143 |
| | | | 114/70 |
| 3,964,418 A | 6/1976 | Karnik et al. | |
| 9,168,983 B2 * | 10/2015 | Lee | B63B 27/143 |

FOREIGN PATENT DOCUMENTS

| | | |
|---|---|---|
| JP | H11-208584 A | 8/1999 |
| JP | 2003-072674 A | 3/2003 |
| KR | 10-0980562 B1 | 8/2010 |
| KR | 10-2014-0062986 A | 5/2014 |
| KR | 10-2016-0017764 A | 2/2016 |
| KR | 10-1615007 B1 | 4/2016 |
| KR | 10-2018-0036783 A | 4/2018 |
| KR | 10-2021-0005419 A | 1/2021 |

(Continued)

*Primary Examiner* — Lars A Olson
(74) *Attorney, Agent, or Firm* — Morgan, Lewis & Bockius LLP

(57) ABSTRACT

A cruise system using mobility vehicles, may include a cruise ship having a cabin space used as a cabin when a mobility vehicle is aboard. A mobility vehicle is configured to board or disembark the cruise ship, and when aboard, park in the cabin space to serve as a cabin. A connector electrically connects the mobility vehicle and the cruise ship to enable power exchange or data communication between the mobility vehicle and the cruise ship.

16 Claims, 6 Drawing Sheets

(56) References Cited

FOREIGN PATENT DOCUMENTS

KR 10-2204661 B1 1/2021

\* cited by examiner

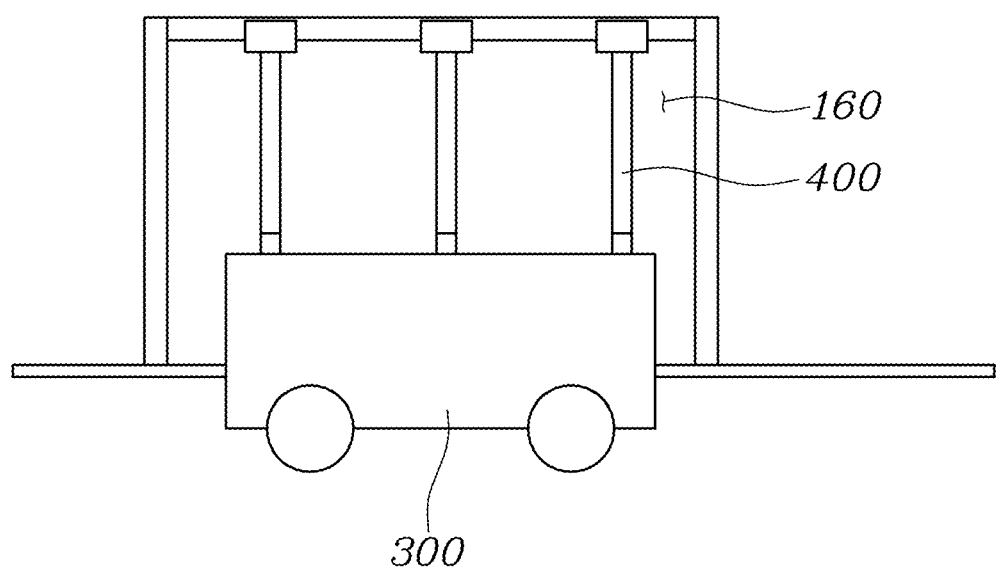

CRUISE SYSTEM USING MOBILITY VEHICLES

CROSS REFERENCE TO RELATED APPLICATION

The present application claims priority to Korean Patent Application No. 10-2021-0044809, filed Apr. 6, 2021, the entire contents of which is incorporated herein for all purposes by this reference.

BACKGROUND OF THE INVENTION

Field of the Invention

The present invention relates to a cruise system using mobility vehicles in which a mobility vehicle normally serving as a travel or tour vehicle on the land may be used as a cabin in which a passenger may stay when the mobility vehicle is aboard a cruise ship. The mobility vehicle may disembark the cruise ship to serve as a tour vehicle when the cruise ship is anchored in a harbor and serve as a lifeboat in an emergency. Accordingly, it is possible to provide a novel concept of cruise service having reduced cost and able to improve the convenience and the satisfaction of tour of the passenger.

Description of Related Art

Existing vehicles are limited to move on the land and provides an accommodation space on the land. For long distance travel, passengers must take a plane or move on the sea by taking a ship and then move in a vehicle on the land from an airport or a harbor, which is inconvenient.

Furthermore, in a situation in which a passenger intends to travel a long distance with his or her own vehicle, the passenger generally follows a pattern of loading the vehicle into a cargo compartment of an airplane or a ship, taking a rest in the airplane or a cabin of the ship, and then, unloading the vehicle from the cargo compartment to move on the land.

However, for the present service, the ship is required to be provided with the cargo compartment accommodating the vehicle in addition to the cabin. Thus, the inefficiency of space utilization may occur, thereby increasing cost, which is problematic.

Accordingly, there is a demand for a novel concept of service able to improve the low efficiency of a ship.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a cruise system using mobility vehicles in which a mobility vehicle normally configured as a travel or tour vehicle on the land may be used as a cabin in which a passenger may stay when the mobility vehicle is aboard a cruise ship. The mobility vehicle may disembark the cruise ship to serve as a tour vehicle when the cruise ship is anchored in a harbor and serve as a lifeboat in an emergency. Accordingly, it is possible to provide a novel concept of cruise service having reduced cost and able to improve the convenience and the satisfaction of tour of the passenger.

In various aspects of the present invention, there is provided a cruise system using mobility vehicles, the cruise system including: a cruise ship including a cabin space used as a cabin when a mobility vehicle is aboard thereon; the mobility vehicle configured to board or disembark the cruise ship, and when aboard, to park in the cabin space to serve as a cabin; and a connector configured for electrically connecting the mobility vehicle and the cruise ship to enable power exchange or data communication between the mobility vehicle and the cruise ship.

A door through which the mobility vehicle enters or exits may be provided inside the cruise ship, a corridor through which the mobility vehicle is movable may be provided inside the cruise ship, and the cabin space may be at least a cabin space provided on one side or a first and a second side of the corridor to allow the mobility vehicle to park therein.

When the cabin space is at least two cabin spaces, the at least two cabin spaces are provided in succession along the corridor inside the cruise ship.

When the mobility vehicle has entered the corridor, the movement of another mobility vehicle that has already parked in a corresponding one of the cabin space may be restricted.

When the mobility vehicle is aboard the cruise ship, the mobility vehicle may be connected to a control server of the cruise ship, and the traveling of the mobility vehicle may be controlled by the control server.

Before the mobility vehicle is aboard thereon, the cabin space in which the mobility vehicle is to park may be designated, and when the mobility vehicle is aboard thereon, the mobility vehicle may be controlled to travel to and park in the designated cabin space.

The cabin space may be provided at an internal position of the cruise ship adjacent to the outside. The mobility vehicle parked in the cabin space may be connected to an interior of the cruise ship through a door on a first side and obtains a view outside the cruise ship through a second side thereof.

When the cruise ship anchors in a destination thereof, the mobility vehicle parked in the cabin space may disembark the cruise ship to serve as a tour mobility on land.

The cabin space may be provided on an external portion of the cruise ship. The mobility vehicle may be fixedly parked in a designated one of the cabin spaces of the cruise ship to serve as a cabin, and in an emergency, may be disconnected from the cruise ship to serve as a lifeboat.

The mobility vehicle may be an amphibious vehicle configured for operating on land and water.

The mobility vehicle may be spatially connected to the interior of the cruise ship through a door on one side thereof while being fixed outside the cruise ship.

The cruise ship may further include a lift unit configured to hold and move upwardly and downwardly the mobility vehicle located outside the cruise ship, the lift unit holding the mobility vehicle and then moving the mobility vehicle upward outside the cruise ship, so that the mobility vehicle is located in the designated cabin space and fixed to an external side portion of the cruise ship.

The mobility vehicle may include a drive battery configured to be charged by the cruise ship through the connector.

According to the cruise system using mobility vehicles according to various exemplary embodiments of the present invention, the mobility vehicle normally provided as a travel or tour vehicle on the land may be used as a cabin in which a passenger may stay when the mobility vehicle is aboard the cruise ship. The mobility vehicle may disembark the cruise to serve as a tour vehicle when the cruise ship is anchored in a harbor and serve as a lifeboat in an emergency. Accordingly, it is possible to provide a novel concept of cruise service having reduced cost and able to improve the convenience and the satisfaction of tour of the passenger.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6 is a view exemplarily illustrating another process of parking a mobility vehicle in a cabin space by the cruise system using mobility vehicles according to various exemplary embodiments of the present invention.

Figure 1:
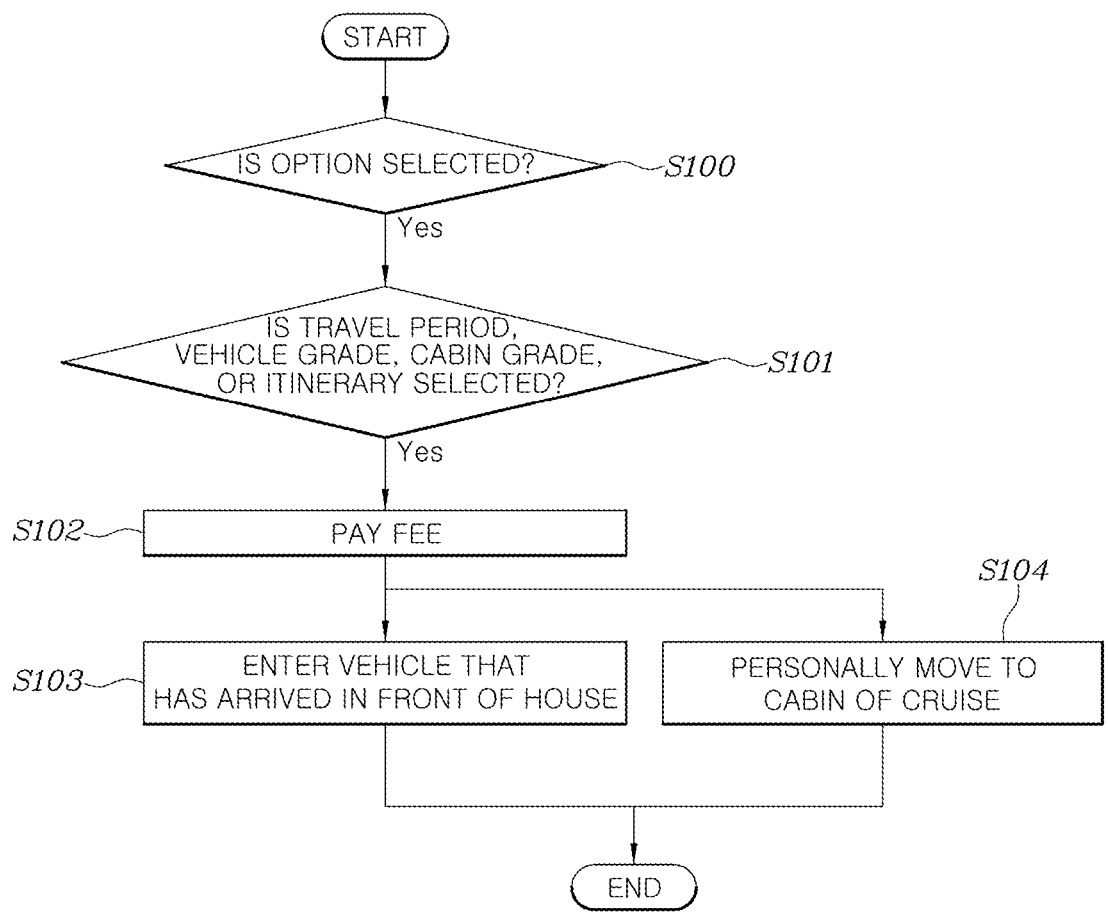
FIG. 1 a flowchart illustrating a service providing process of a cruise system using mobility vehicles according to exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
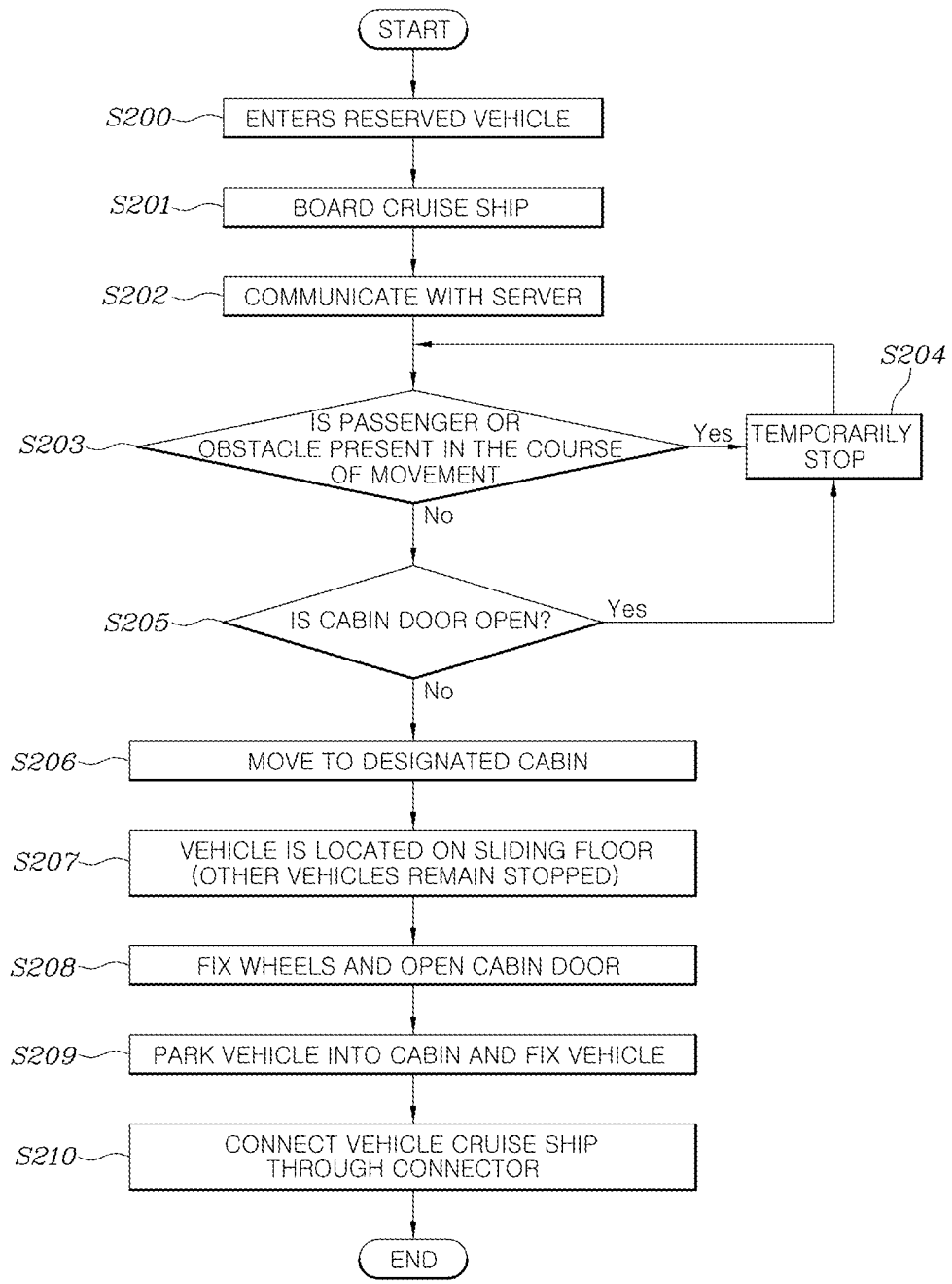
FIG. 2 is a flowchart illustrating a boarding process of the cruise system using mobility vehicles according to exemplary embodiments of the present invention.
Figure 3:
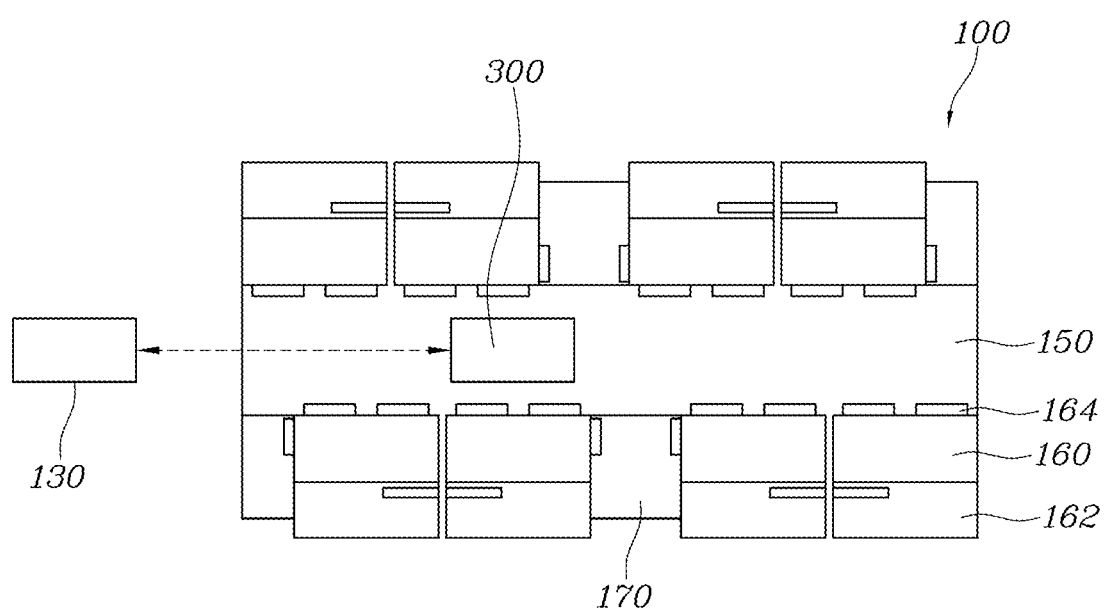
FIG. 3 is a view exemplarily illustrating cabin spaces in a cruise ship of the cruise system using mobility vehicles according to various exemplary embodiments of the present invention.
Figure 4:
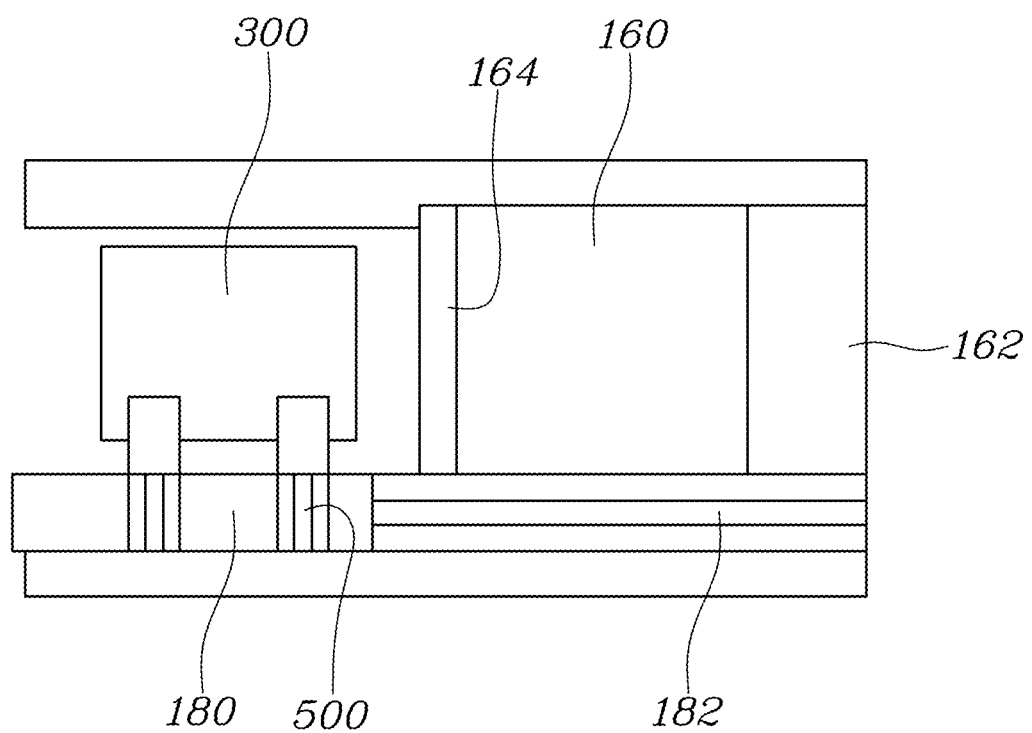
FIG. 4 and FIG. 5 are views exemplarily illustrating a process of parking a mobility vehicle in a cabin space by the cruise system using mobility vehicles according to exemplary embodiments of the present invention.
Figure 5:
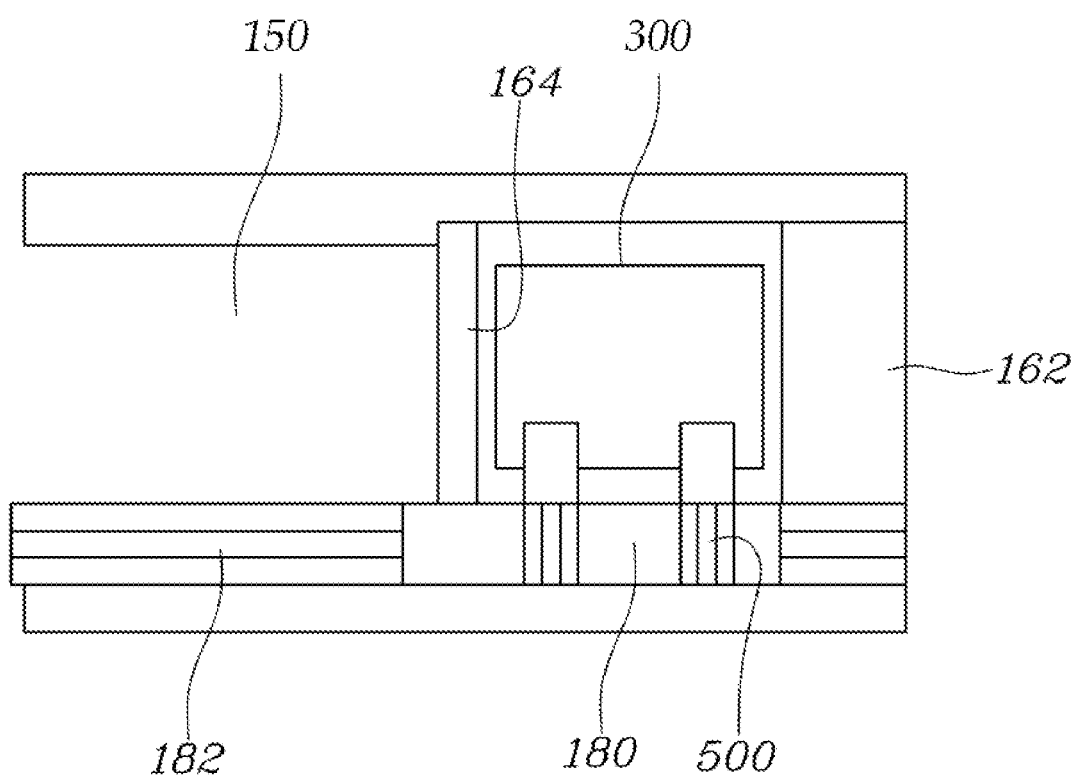

FIG. 1 a flowchart illustrating a service providing process of a cruise system using mobility vehicles according to exemplary embodiments of the present invention, FIG. 2 is a flowchart illustrating a boarding process of the cruise system using mobility vehicles according to exemplary embodiments of the present invention, FIG. 3 is a view exemplarily illustrating cabin spaces in a cruise ship of the cruise system using mobility vehicles according to various exemplary embodiments of the present invention, FIG. 4 and FIG. 5 are views exemplarily illustrating a process of parking a mobility vehicle in a cabin space by the cruise system using mobility vehicles according to exemplary embodiments of the present invention, and FIG. 6 is a view exemplarily illustrating another process of parking a mobility vehicle in a cabin space by the cruise system using mobility vehicles according to various exemplary embodiments of the present invention.

The cruise system using mobility vehicles according to various exemplary embodiments of the present invention is a service system using a cruise ship provided with a cabin space in which vehicles may be parked and used as cabins. Furthermore, in a situation in which a vehicle is an autonomous vehicle, the vehicle moves to a ship when passengers who have made a reservation are aboard, enter the ship, move to the cabin space, and park in the cabin space. The vehicle is electrically and communicatively connected to the ship to serve as a cabin.

FIG. 1 is the flowchart illustrating the service providing process of the cruise system using mobility vehicles according to exemplary embodiments of the present invention. The cruise system using mobility vehicles according to various exemplary embodiments of the present invention may include a cruise ship 100 provided with cabin spaces 160 respectively configured to be used as a cabin when a mobility vehicle is aboard thereon; a mobility vehicle 300 configured to board or disembark the cruise ship 100, and when aboard, park in a corresponding one of the cabin spaces 160 to serve as a cabin; and a connector 500 electrically connecting the mobility vehicle 300 and the cruise ship 100 to enable power exchange or data communication between the mobility vehicle 300 and the cruise ship 100.

The cruise ship 100 according to various exemplary embodiments of the present invention is a ship that the mobility vehicle 300 may board. The mobility vehicle 300 may not only enter a cargo compartment of a ship but also is configured as a cabin in a cruise ship provided with cabin spaces usable as cabins.

Furthermore, the mobility vehicle 300 may board or disembark the cruise ship 100, and when aboard, park in the corresponding cabin space 160 to serve as a cabin. Furthermore, the connector 500 electrically connects the mobility vehicle 300 and the cruise ship 100 to enable power exchange or data communication between the mobility vehicle 300 and the cruise ship 100.

To help the mobility vehicle 300 serve as a cabin, a door through which the mobility vehicle 300 may enter or exit is provided inside the cruise ship 100. Furthermore, a corridor 150 through which the mobility vehicle 300 may move is provided inside the cruise ship 100. The cabin spaces 160 in which the mobility vehicle 300 is to park may be provided on one or both sides of the corridor 150. Thus, the mobility vehicle 300 may travel while carrying passengers like a typical vehicle on the land. When the mobility vehicle 300 is aboard the cruise ship 100, the mobility vehicle 300 may travel within the cruise ship 100 along the corridor 150 and park in the designated cabin space 160. Accordingly, a passenger may use the cabin space 160 not only simply as a parking lot or garage but also as his or her cabin.

Therefore, according to various exemplary embodiments of the present invention, it is not required to separately provide a space for the mobility vehicle 300 and a space for the passenger inside the cruise ship 100, and both the mobility vehicle 300 and the passenger may be accommodated in the single cabin space 160, thereby improving the efficiency of space utilization. Furthermore, no separate equipment or interior for the cabin is required, thereby reducing cost. Furthermore, since the passenger utilizes his or her own vehicle, the passenger may comfortably use the cruise ship at a low cost.

As illustrated in FIG. 1, the passenger performs communication with a service server using a mobile terminal or the like to use a service. The passenger makes a reservation for the service at home. The passenger selects an option of the service in S100. The passenger makes a reservation for a vehicle, for example, by selecting an option from among a cabin vehicle, a tour vehicle, a cabin, and the like. When the passenger has made a reservation for a vehicle, a travel period, the grade of the vehicle or the grade of a cabin, an itinerary, and the like are selected in S101. The passenger pays the fee in S102. When a vehicle arrives in front of the house, the passenger enters the vehicle and moves to the cruise ship in the vehicle in S103. When the vehicle is not reserved, the passenger moves to the cruise ship by him or herself in another method in S104.

FIG. 2 is a flowchart illustrating the boarding process of the cruise system using mobility vehicles according to exemplary embodiments of the present invention. The passenger enters the reserved vehicle in S200 and boards the cruise ship in S201. The vehicle performs communication with a server of the ship in S202 and determines whether or not another passenger or an obstacle is present in a course of movement of the vehicle in S203. In S204, when there is an obstacle in the course, the vehicle temporarily stops, and when there is no obstacle in the course, the vehicle continuously moves. After the vehicle has arrived at the corridor, when the corridor is narrow, the vehicle determines whether or not the door of another cabin is open, and when the door is open, temporarily stops to prepare for possible movement of another vehicle in S205. When it is determined that there is no possibility that another vehicle will move, the vehicle travels along the corridor and arrives in front of the designated cabin space S206. Afterwards, the vehicle is conveyed to the cabin space on a sliding floor. The vehicle is located on the sliding floor in S207, and the wheels of the vehicle are fixed and the door of the cabin is opened in S208. The vehicle is parked and fixed in the cabin space so that the passenger in the vehicle may use the vehicle as a cabin in S209. In S210, the vehicle is connected to the cruise ship through the connector to charge the battery of the vehicle or perform communication.

FIG. 3 is a view exemplarily illustrating the cabin spaces in the cruise ship of the cruise system using mobility vehicles according to exemplary embodiments of the present invention. A plurality of cabin spaces 160 may be provided in succession along the corridor 150 inside the cruise ship 100. Thus, the passenger may use the internal space of the vehicle as a cabin, and when out of the vehicle, may use other facilities in the ship by moving along the corridor 150.

Furthermore, when the corridor is narrow, it is difficult for vehicles to travel in both directions, and it is necessary to allow only a single mobility vehicle to travel along the corridor at one time for safety. In this regard, when the mobility vehicle 300 has entered the corridor 150, the movement of another mobility vehicle that has already parked in the designated cabin space 160 may be restricted.

Furthermore, when the mobility vehicle 300 is aboard the cruise ship 100, the mobility vehicle 300 may be connected to and controlled by a control server 130 of the cruise ship 100. That is, to prevent an accident which may occur when the passenger drives the mobility vehicle within the cruise ship 100, the control server 130 of the ship may control the mobility vehicle aboard the ship to automatically travel by an autonomous driving function.

Furthermore, before the mobility vehicle 300 is aboard thereon, the cabin space 160 in which the mobility vehicle 300 is to park may be designated. When the mobility vehicle 300 is aboard thereon, the mobility vehicle 300 may be controlled to travel to and then park in the designated cabin space 160.

Furthermore, the cabin space 160 may be provided with a door 164. After the vehicle has parked in the cabin space 160, the door 164 is allowed to be closed or opened. A common area 170, such as a toilet, may be provided between cabin spaces to be commonly used. A terrace 162 may be provided on an external portion of each of the cabin spaces so that the passenger using the vehicle as a cabin does not feel closed in.

That is, the cabin space 160 may be provided at an internal position of the cruise ship 100 adjacent to the outside, and the mobility vehicle 300 parked in the cabin space 160 may be connected to the interior of the cruise ship 100 through the door 164 on one side and may obtain a view outside the cruise ship 100 through the other side thereof Furthermore, when the cruise ship anchors in a harbor, the mobility vehicle 300 parked in the cabin space 160 may disembark the cruise ship 100 to serve as a tour mobility on the land. After the tour, the mobility vehicle 300 may board the cabin space 160 again and park in the cabin space to serve as a cabin. In the present manner, maximum convenience may be provided to the passenger, and the vehicle may be utilized sufficiently during the period in which the vehicle is rented.

FIG. 4 and FIG. 5 are views exemplarily illustrating a process of parking a mobility vehicle in the cabin space by the cruise system using mobility vehicles according to various exemplary embodiments of the present invention. When the vehicle is located on the sliding floor 180, the wheels of the vehicle may be fixed, and in the present state, the sliding floor 180 may slide to the side along a slide portion 182, thereby parking the vehicle in the cabin space 160. When the door 164 is closed, the vehicle is configured as a completely-independent cabin. In addition to the fixing of the vehicle, the vehicle may be connected to the ship through the connector 500. The mobility vehicle according to various exemplary embodiments of the present invention may be provided with a drive battery which may be charged by the cruise ship through the connector 500.

FIG. 6 is another view exemplarily illustrating another process of parking a mobility vehicle in a cabin space by the cruise system using mobility vehicles according to various exemplary embodiments of the present invention. The cabin space according to various exemplary embodiments of the present invention may be provided on an external portion of the cruise ship. That is, the cabin space may be a space connected to the outside. In the present situation, the mobility vehicle 300 may be fixed parked in a designated one of the cabin spaces 160 of the cruise ship to serve as a cabin. In an emergency, the mobility vehicle 300 may be disconnected from the cruise ship to serve as a lifeboat.

Furthermore, the mobility vehicle may be an amphibious vehicle configured for operating on land and water. In the present situation, the mobility vehicle may be spatially connected to the interior of the cruise ship through a door on one side thereof while being fixed outside the cruise ship.

The cruise ship may be provided with a lift unit 400 configured to hold and move upwardly and downwardly the mobility vehicle located outside. The lift unit 400 may hold the mobility vehicle 300 and then move the mobility vehicle 300 upward outside the cruise ship. Consequently, the mobility vehicle 300 may be located in the cabin space 160 and fixed to an external side portion of the cruise ship.

In a situation in which the mobility vehicle is an amphibious vehicle configured for operating on both land water, the mobility vehicle on the land or the water may be moved upward by the lift unit. Accordingly, the uplifted mobility vehicle 300 may be fixed in the cabin space 160 to serve as the cabin of the ship. Also in the present situation, the passenger may move into the cruise ship through the door, and in an emergency, use the vehicle as a lifeboat before being rescued.

According to the cruise system using mobility vehicles according to various exemplary embodiments of the present invention, the mobility vehicle normally provided as a travel or tour vehicle on the land may be used as a cabin in which a passenger may stay when the mobility vehicle is aboard the cruise ship. The mobility vehicle may disembark the cruise to serve as a tour vehicle when the cruise ship is anchored in a harbor and serve as a lifeboat in an emergency. Accordingly, it is possible to provide a novel concept of cruise service having reduced cost and able to improve the convenience and the satisfaction of tour of the passenger.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A cruise system using mobility vehicles, the cruise system comprising:
   a cruise ship including a cabin space used as a cabin when a mobility vehicle is aboard thereon;
   the mobility vehicle configured to board or disembark the cruise ship, and when aboard, to park in the cabin space to serve as a cabin; and
   a connector configured for electrically connecting the mobility vehicle and the cruise ship to enable power exchange or data communication between the mobility vehicle and the cruise ship,
   wherein, when the mobility vehicle is aboard the cruise ship, the mobility vehicle is connected to a control server, and traveling of the mobility vehicle is controlled by the control server.

2. The cruise system of claim 1,
   wherein a door through which the mobility vehicle enters or exits is provided inside the cruise ship, and
   wherein a corridor through which the mobility vehicle is movable is provided inside the cruise ship.

3. The cruise system of claim 2,
   wherein the cabin space is at least a cabin space provided on one side or a first and a second side of the corridor to allow the mobility vehicle to park therein.

4. The cruise system of claim 3,
   wherein when the cabin space is at least two cabin spaces, the at least two cabin spaces are provided in succession along the corridor inside the cruise ship.

5. The cruise system of claim 4, wherein, when the mobility vehicle has entered the corridor, a movement of another mobility vehicle that has already parked in a corresponding one of the at least two cabin spaces among the mobility vehicles is restricted.

6. The cruise system of claim 1, wherein, before the mobility vehicle is aboard thereon, the cabin space in which the mobility vehicle is to park is designated, and when the mobility vehicle is aboard thereon, the mobility vehicle is controlled by the control server to travel to and park in the designated cabin space.

7. The cruise system of claim 1, wherein the cabin space is provided at an internal position of the cruise ship adjacent to the outside of the cruise ship, and the mobility vehicle parked in the cabin space is connected to an interior of the cruise ship through a door on a first side thereof and obtains a view outside the cruise ship through a second side thereof.

8. The cruise system of claim 1, wherein, when the cruise ship anchors in a destination thereof, the mobility vehicle parked in the cabin space is allowed to disembark the cruise ship to serve as a tour mobility on land.

9. The cruise system of claim 1,
   wherein the cabin space is at least a cabin space,
   wherein the at least a cabin space is provided on an external portion of the cruise ship, and
   wherein the mobility vehicle is fixedly parked in a designated one of the at least a cabin space of the cruise ship to serve as a cabin.

10. The cruise system of claim 9,
    wherein the mobility vehicle fixedly parked in the designated one of the at least a cabin space of the cruise ship is configured to be disconnected from the cruise ship to serve as a lifeboat.

11. The cruise system of claim 10, wherein the mobility vehicle is an amphibious vehicle configured for operating on land and water.

12. The cruise system of claim 9, wherein the mobility vehicle is spatially connected to the interior of the cruise ship through a door on one side thereof while being fixed outside the cruise ship.

13. The cruise system of claim 9, wherein the cruise ship further includes:
    a lift unit configured to hold and move upwardly and downwardly the mobility vehicle located outside the cruise ship,
    wherein the lift unit is configured to hold the mobility vehicle and then to move the mobility vehicle upward outside the cruise ship, so that the mobility vehicle is located in the designated cabin space and fixed to an external side portion of the cruise ship.

14. The cruise system of claim 1, wherein the mobility vehicle includes a drive battery configured to be charged by the cruise ship through the connector.

15. A cruise system using mobility vehicles, the cruise system comprising:
    a cruise ship provided with a cabin space used as a cabin when a mobility vehicle is aboard thereon, wherein the cruise ship includes a connector configured for electrically connecting the mobility vehicle and the cruise ship to enable power exchange or data communication between the mobility vehicle and the cruise ship; and a control server, wherein, when the mobility vehicle is aboard the cruise ship, the mobility vehicle is connected to the control server of the cruise ship, and traveling of the mobility vehicle is controlled by the control server.

16. The cruise system of claim 15, wherein the cruise ship further includes:

a lift unit configured to hold and move upwardly and downwardly the mobility vehicle located outside the cruise ship, wherein the lift unit is configured to hold the mobility vehicle and then to move the mobility vehicle upward outside the cruise ship, so that the mobility vehicle is located in the cabin space and fixed to an external side portion of the cruise ship.

* * * * *